US012739493B2

(12) United States Patent
Watanabe

(10) Patent No.: US 12,739,493 B2
(45) Date of Patent: Sep. 15, 2026

(54) IMAGING DEVICE, TRACKING SYSTEM, AND IMAGING METHOD FOR IDENTIFYING AND TRACKING IMAGING TARGET

(71) Applicant: SONY SEMICONDUCTOR SOLUTIONS CORPORATION, Kanagawa (JP)

(72) Inventor: Masahiro Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 156 days.

(21) Appl. No.: 18/548,583

(22) PCT Filed: Jan. 19, 2022

(86) PCT No.: PCT/JP2022/001685
§ 371 (c)(1),
(2) Date: Sep. 1, 2023

(87) PCT Pub. No.: WO2022/190652
PCT Pub. Date: Sep. 15, 2022

(65) Prior Publication Data

US 2024/0155221 A1 May 9, 2024

(30) Foreign Application Priority Data

Mar. 9, 2021 (JP) ................................ 2021-037678

(51) Int. Cl.
*H04N 23/611* (2023.01)
*G06T 7/246* (2017.01)
(Continued)

(52) U.S. Cl.
CPC ........... *H04N 23/611* (2023.01); *G06T 7/246* (2017.01); *H04N 23/695* (2023.01); *H04N 23/90* (2023.01);
(Continued)

(58) Field of Classification Search
CPC .... H04N 23/611; H04N 23/695; H04N 23/90; H04N 5/77; H04N 5/92; H04N 7/18;
(Continued)

(56) References Cited

U.S. PATENT DOCUMENTS 6,072,903 A * 6/2000 Maki ....................... G06T 7/251 348/169
7,925,053 B2 * 4/2011 Altherr .................. G06T 7/246 348/208.99
(Continued)

FOREIGN PATENT DOCUMENTS

CN 1574961 A 2/2005
CN 101582839 A 11/2009
(Continued)

OTHER PUBLICATIONS

International Search Report and Written Opinion of PCT Application No. PCT/JP2022/001685, issued on Mar. 29, 2022, 09 pages of ISRWO.

*Primary Examiner* — Chiawei Chen
(74) *Attorney, Agent, or Firm* — CHIP LAW GROUP

(57) ABSTRACT

Provided is an imaging device including an imaging unit that captures an image of an object, a feature amount extracting section that extracts a plurality of feature amounts of the object whose image has been captured by the imaging unit, a priority determining section that determines priority of the plurality of feature amounts extracted by the feature amount extracting section, and a control section that determines feature amounts according to a priority level and an allow-
(Continued)

able amount at an output destination. The imaging device further includes a moving direction calculating section that computes the moving direction of the object and a output unit that outputs the feature amounts and the moving direction in association with each other.

13 Claims, 7 Drawing Sheets

(51) Int. Cl.
*H04N 23/695* (2023.01)
*H04N 23/90* (2023.01)

(52) U.S. Cl.
CPC ............... *G06T 2207/10004* (2013.01); *G06T 2207/10024* (2013.01)

(58) Field of Classification Search
CPC ........ H04N 23/61; H04N 7/181; G06T 7/246; G06T 2207/10004; G06T 2207/10024; G06T 7/20; G06T 7/292
See application file for complete search history.

(56) References Cited

U.S. PATENT DOCUMENTS

| | | | | |
|---|---|---|---|---|
| 8,599,267 | B2 | 12/2013 | Kuwano | |
| 8,649,565 | B1 * | 2/2014 | Kim | G06F 18/2111 382/106 |
| 9,591,220 | B2 * | 3/2017 | Kobayashi | G06T 7/0004 |
| 10,203,505 | B2 * | 2/2019 | Levinshtein | G06T 7/73 |
| 10,896,495 | B2 * | 1/2021 | Gu | G06V 10/25 |
| 2007/0130599 | A1 * | 6/2007 | Monroe | H04B 7/18506 348/E7.086 |
| 2012/0230596 | A1 * | 9/2012 | Watanabe | H04N 21/4627 382/232 |
| 2013/0188045 | A1 * | 7/2013 | Kalevo | G06V 20/52 348/143 |
| 2014/0169627 | A1 * | 6/2014 | Gupta | G06V 20/588 382/103 |
| 2014/0211988 | A1 * | 7/2014 | Fan | G06V 20/52 382/103 |
| 2016/0012597 | A1 * | 1/2016 | Wnuk | G06T 7/246 382/103 |
| 2016/0165134 | A1 * | 6/2016 | Lelescu | G06T 3/4069 348/218.1 |
| 2016/0196663 | A1 * | 7/2016 | Yoneyama | G06T 7/248 382/103 |
| 2016/0306264 | A1 * | 10/2016 | Chu | F16M 13/04 |
| 2017/0006219 | A1 * | 1/2017 | Adsumilli | H04N 23/90 |
| 2017/0124405 | A1 * | 5/2017 | Gupta | G06V 20/64 |
| 2017/0186291 | A1 * | 6/2017 | Wenus | H04N 23/45 |
| 2017/0270678 | A1 * | 9/2017 | Masumoto | G06T 19/006 |
| 2018/0093159 | A1 * | 4/2018 | DeAngelis | H04W 4/023 |
| 2018/0101744 | A1 * | 4/2018 | Bar-Nahum | G06V 20/13 |
| 2018/0150974 | A1 * | 5/2018 | Abe | G06T 7/74 |
| 2018/0160034 | A1 * | 6/2018 | Yang | H04N 7/185 |
| 2018/0260961 | A1 * | 9/2018 | Narita | H04N 23/60 |
| 2019/0373170 | A1 * | 12/2019 | Fujita | H04N 23/695 |
| 2020/0074673 | A1 * | 3/2020 | Gupta | G06F 18/214 |
| 2020/0288087 | A1 * | 9/2020 | Iwakiri | H04L 43/0876 |
| 2021/0334937 | A1 * | 10/2021 | Afsham | G06T 3/4046 |
| 2022/0148253 | A1 * | 5/2022 | Sanders | G06T 15/005 |
| 2022/0294742 | A1 * | 9/2022 | Shibata | H04L 49/205 |

FOREIGN PATENT DOCUMENTS

| | | | |
|---|---|---|---|
| CN | 110855941 | A | 2/2020 |
| JP | 2016-127563 | A | 7/2016 |
| JP | 2018-005555 | A | 1/2018 |
| JP | 2018-093283 | A | 6/2018 |
| JP | 2019-016098 | A | 1/2019 |
| JP | 2019204529 | A | 11/2019 |
| JP | 2020047051 | A | 3/2020 |
| JP | 2021018551 | A | 2/2021 |
| TW | 201929550 | A | 7/2019 |
| TW | 202019147 | A | 5/2020 |
| TW | I695326 | B | 6/2020 |

* cited by examiner

FIG. 3
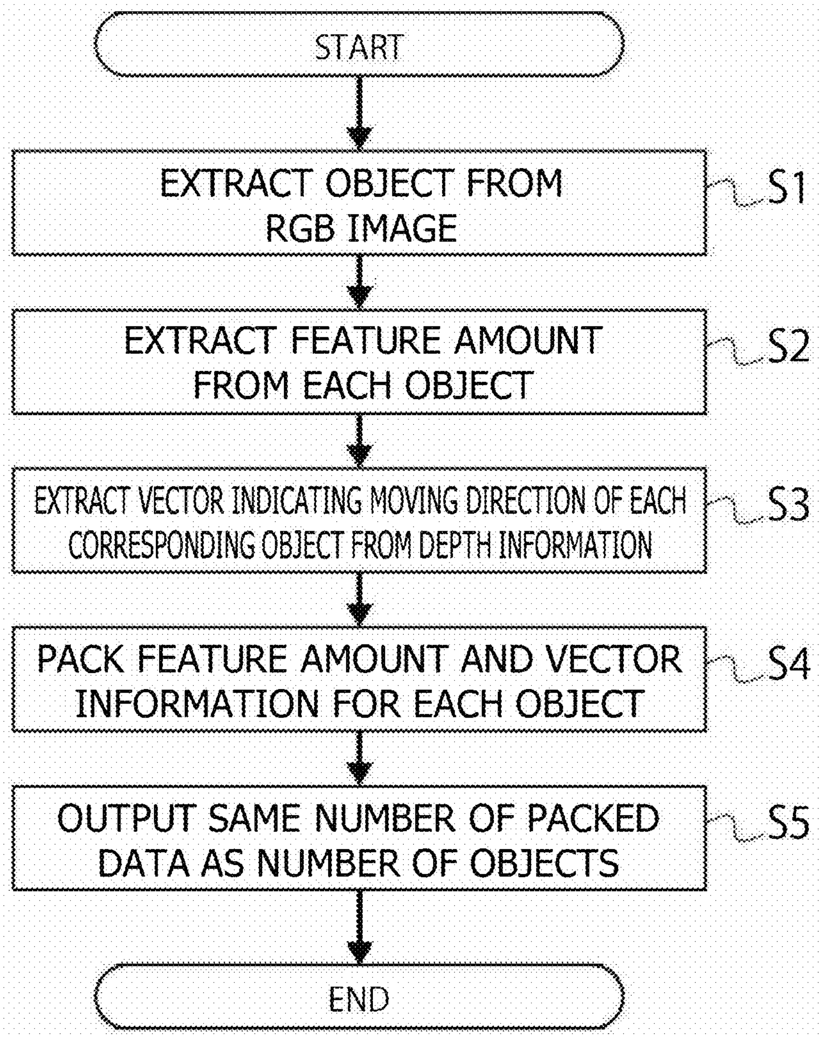
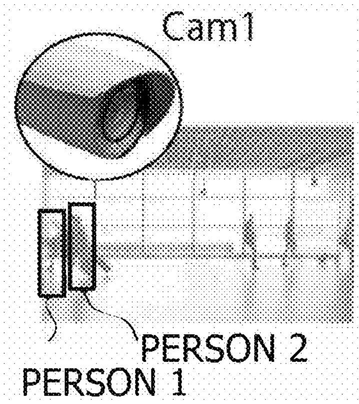
FIG. 4A
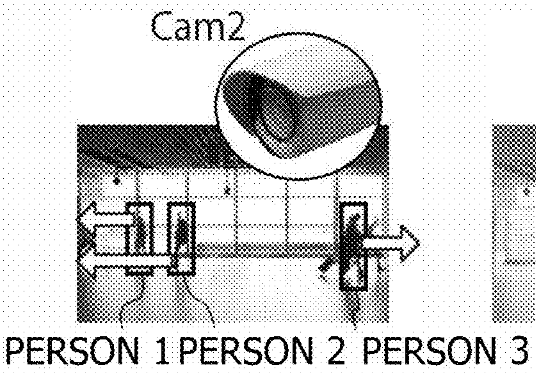
FIG. 4B
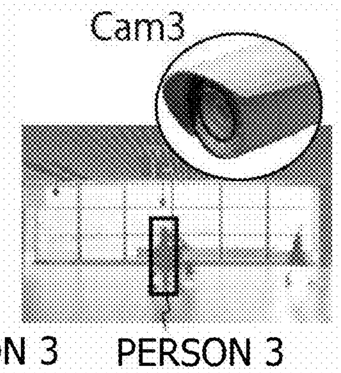
FIG. 4C

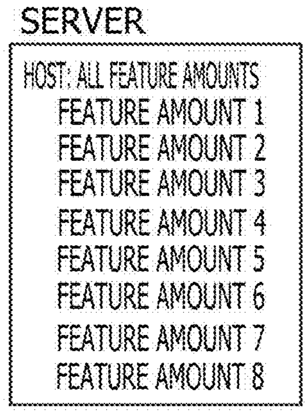

FIG. 5A

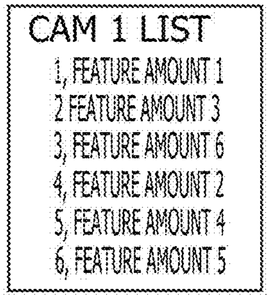

FIG. 5B

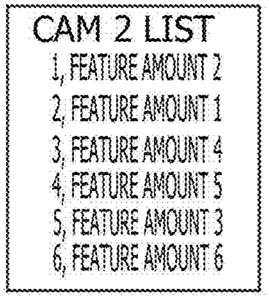

FIG. 5C

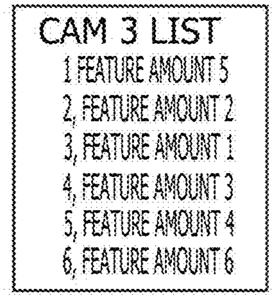

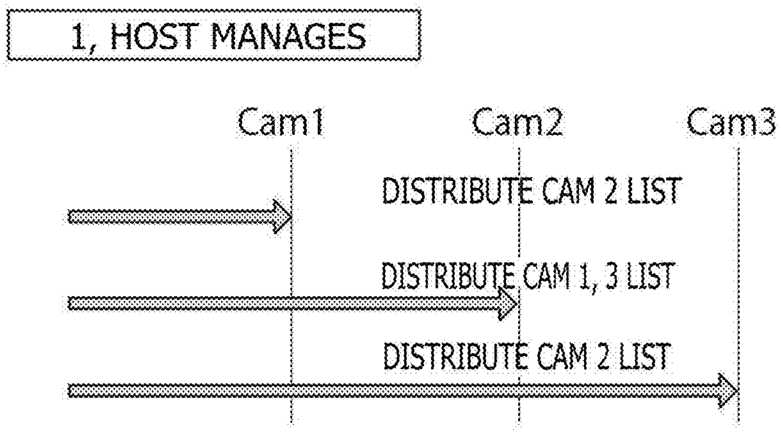

FIG. 7

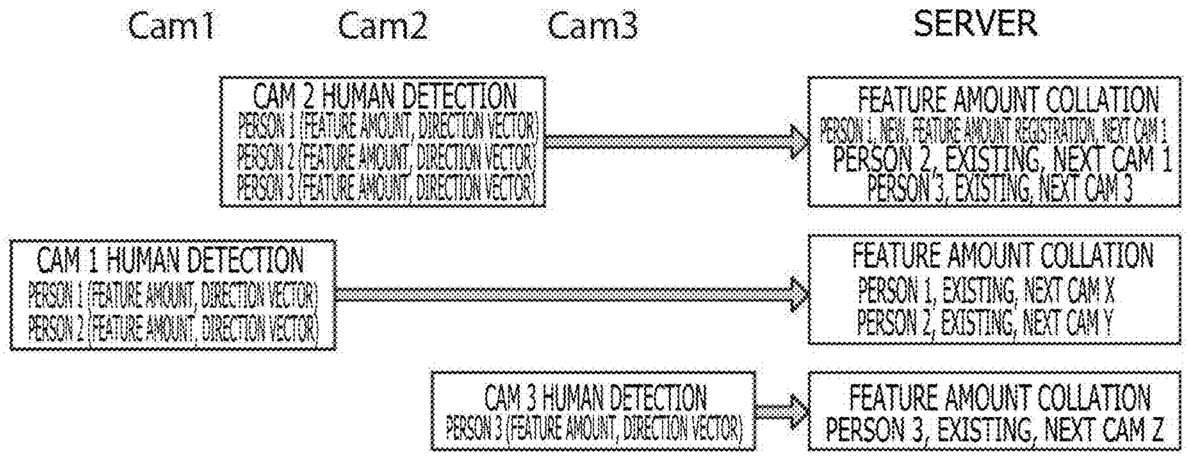

SERVER

HOST: ALL FEATURE AMOUNTS
FEATURE AMOUNT 1
FEATURE AMOUNT 2
FEATURE AMOUNT 3
FEATURE AMOUNT 4
FEATURE AMOUNT 5
FEATURE AMOUNT 6
FEATURE AMOUNT 7
FEATURE AMOUNT 8

CAM 1 LIST
1, FEATURE AMOUNT 1
2 FEATURE AMOUNT 3
3, FEATURE AMOUNT 6
4, FEATURE AMOUNT 2
5, FEATURE AMOUNT 4
6, FEATURE AMOUNT 5

CAM 2 LIST
1, FEATURE AMOUNT 2
2, FEATURE AMOUNT 1
3, FEATURE AMOUNT 4
4, FEATURE AMOUNT 5
5, FEATURE AMOUNT 3
6, FEATURE AMOUNT 6

CAM 3 LIST
1 FEATURE AMOUNT 5
2, FEATURE AMOUNT 2
3, FEATURE AMOUNT 1
4, FEATURE AMOUNT 3
5, FEATURE AMOUNT 4
6, FEATURE AMOUNT 6

FIG. 10
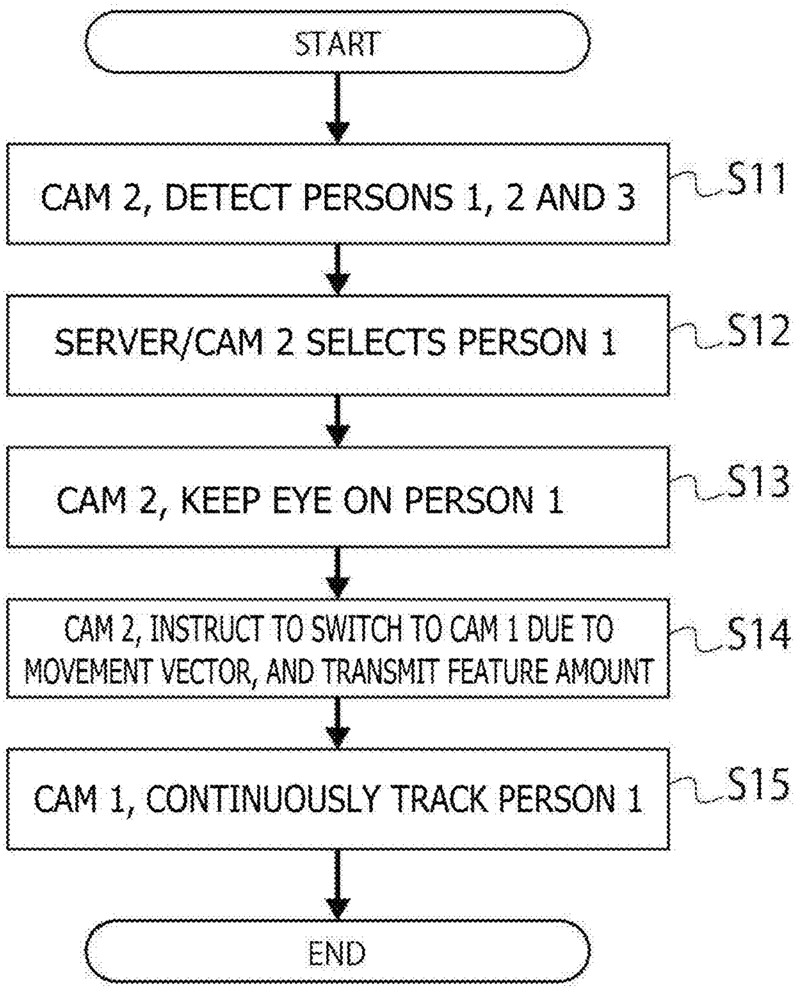
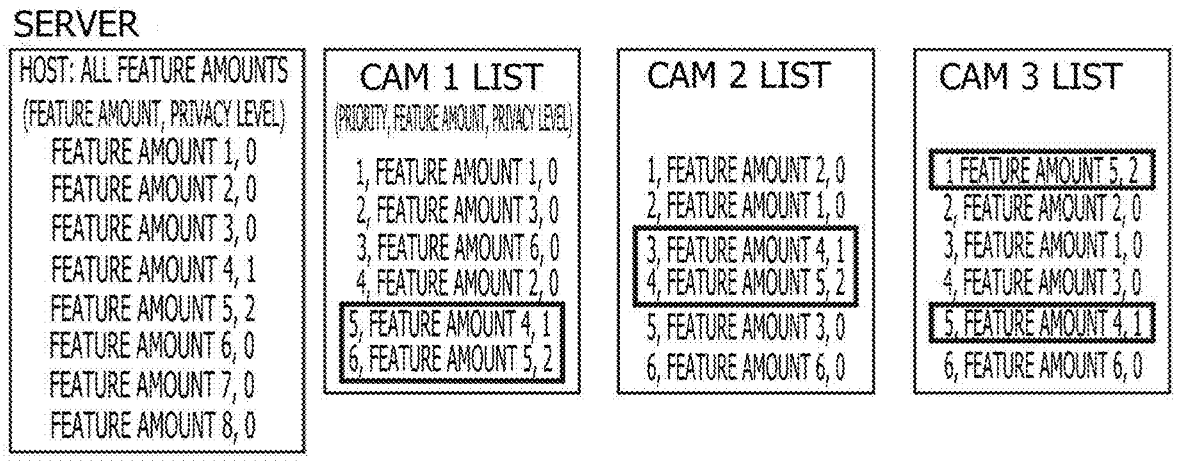
FIG. 11A FIG. 11B FIG. 11C FIG. 11D

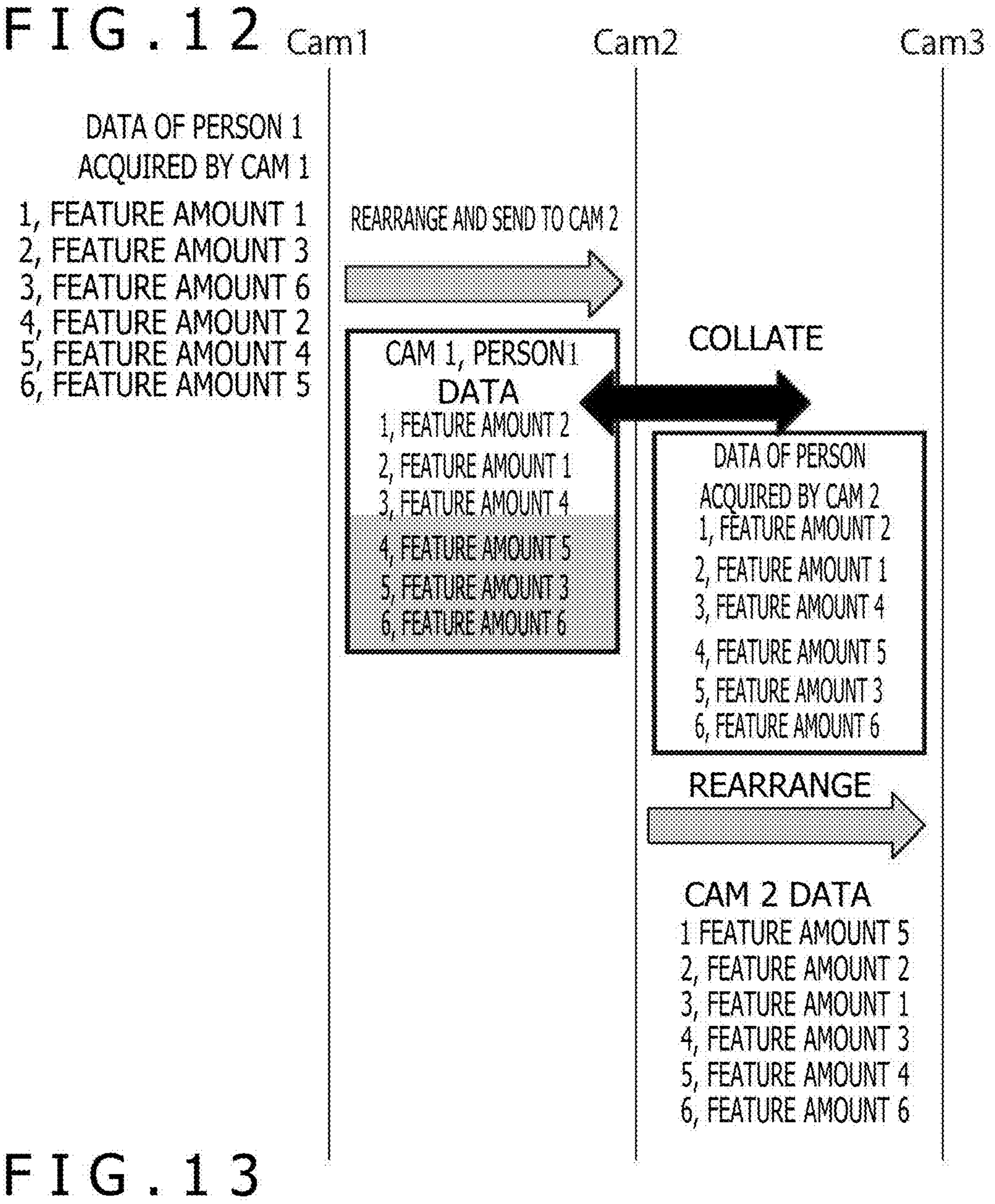

FIG. 12

Cam1 Cam2 Cam3

DATA OF PERSON 1
ACQUIRED BY CAM 1
1, FEATURE AMOUNT 1
2, FEATURE AMOUNT 3
3, FEATURE AMOUNT 6
4, FEATURE AMOUNT 2
5, FEATURE AMOUNT 4
6, FEATURE AMOUNT 5

REARRANGE AND SEND TO CAM 2

CAM 1, PERSON 1
DATA
1, FEATURE AMOUNT 2
2, FEATURE AMOUNT 1
3, FEATURE AMOUNT 4
4, FEATURE AMOUNT 5
5, FEATURE AMOUNT 3
6, FEATURE AMOUNT 6

COLLATE

DATA OF PERSON
ACQUIRED BY CAM 2
1, FEATURE AMOUNT 2
2, FEATURE AMOUNT 1
3, FEATURE AMOUNT 4
4, FEATURE AMOUNT 5
5, FEATURE AMOUNT 3
6, FEATURE AMOUNT 6

REARRANGE

CAM 2 DATA
1 FEATURE AMOUNT 5
2, FEATURE AMOUNT 2
3, FEATURE AMOUNT 1
4, FEATURE AMOUNT 3
5, FEATURE AMOUNT 4
6, FEATURE AMOUNT 6

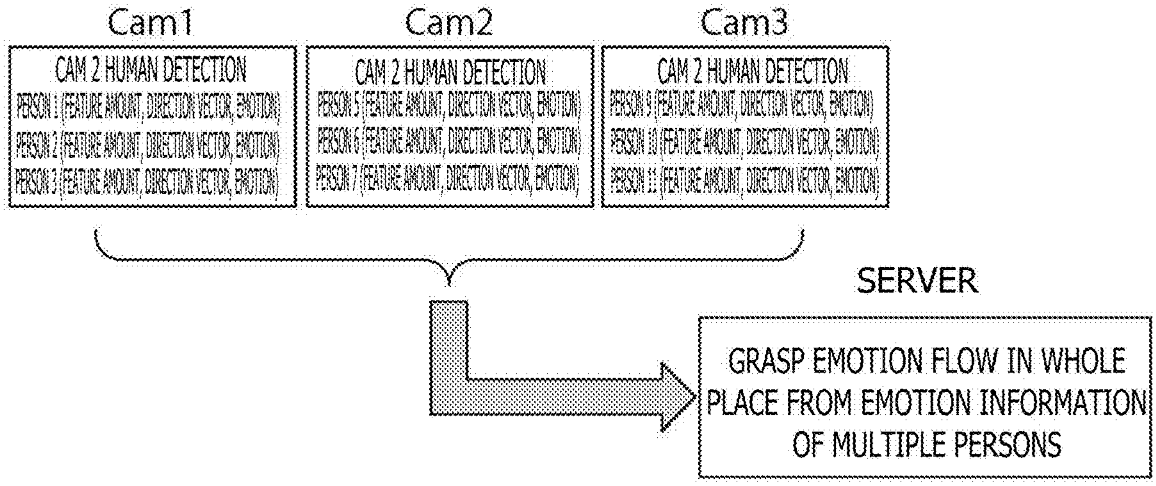

FIG. 13

IMAGING DEVICE, TRACKING SYSTEM, AND IMAGING METHOD FOR IDENTIFYING AND TRACKING IMAGING TARGET

CROSS REFERENCE TO RELATED APPLICATIONS

This application is a U.S. National Phase of International Patent Application No. PCT/JP2022/001685 filed on Jan. 19, 2022, which claims priority benefit of Japanese Patent Application No. JP 2021-037678 filed in the Japan Patent Office on Mar. 9, 2021. Each of the above-referenced applications is hereby incorporated herein by reference in its entirety.

TECHNICAL FIELD

The present technology relates to an imaging device, a tracking system, and an imaging method, and more particularly to an imaging device, a tracking system, and an imaging method that identify an imaging target and track movement of the imaging target.

BACKGROUND ART

Conventionally, a monitoring system is known that can distinguish a person from other persons whose faces are subjected to face recognition, by obtaining and recording a movement trajectory of the person from images captured by a security camera, and recognizing the face of the person whose movement trajectory is obtained.

For example, in PTL 1, a monitoring information collecting system has been proposed including imaging means for monitoring, human detection means that detects a person from images captured by the imaging means, trajectory analyzing means that analyzes in the images, a person detected by the human detection means and obtaining a movement trajectory, face recognition means for recognizing a face by obtaining facial data that can distinguish the face from other faces, from the face in the images of a person who is detected by the human detecting means and whose moving trajectory is obtained by the trajectory analyzing means, recording means for recording the face data and the movement trajectory corresponding to the face data in association with identification codes that allow the face data of different persons to be distinguished from each other, face determination means for comparing the face data obtained by the face recognition means with the face data recorded in the recording means, and determining whether or not the face data satisfies a predetermined condition, and face data collecting means that records in the recording means, the movement trajectory corresponding to the face data obtained by the face recognition means, in association with the identification code associated with the face data that agrees with the face data and is recorded in the recording means in the case where the condition is satisfied, and that records in the recording means, the face data obtained by the face recognition means and the moving trajectory corresponding to the face data, in association with the identification code not yet associated with the face data in the case where the condition is not satisfied.

CITATION LIST

Patent Literature

PTL 1

JP 2018-93283 A

SUMMARY

Technical Problem

However, with the technique disclosed in PTL 1, an amount of data to be recorded in the imaging means increases, and there is a possibility that a communication speed between the imaging means will be slowed down or data will not be able to be exchanged. In addition, in the technique of PTL 1, since it is not assumed that the imaging means to which the data is to be transferred is determined according to the environmental conditions or the like of the imaging means on the data receiving side, depending on the state of the environment or the like, it may be impossible to detect the object with high accuracy.

Therefore, a main object of the present technology is to provide an imaging device capable of increasing object detection accuracy while reducing the data bandwidth.

Solution to Problem

An imaging device according to the present technology includes an imaging unit that captures an image of an object, a feature amount extracting section that extracts a plurality of feature amounts of the object whose image has been captured by the imaging unit, a priority determining section that determines priority of the plurality of feature amounts extracted by the feature amount extracting section, a control section that determines the feature amounts according to a level of the priority and an allowable amount of an output destination, and an output unit that outputs the feature amounts determined by the control section. The imaging unit can simultaneously capture the image of the object in the same area.

The imaging device according to the present technology may further include a moving direction calculating section that calculates a moving direction of the object, and the output unit can also output the feature amounts and the moving direction in association with each other. The priority determining section has a privacy level setting section that sets a privacy level of each of the feature amounts, and can determine the priority according to the privacy level. The imaging device according to the present technology further includes an imaging position acquiring section that acquires an imaging position and an imaging direction of the imaging unit, and the output unit can also output the imaging position and the imaging direction. The imaging device according to the present technology further includes an environmental information acquiring section that acquires environmental information around the imaging device, and the control section can also determine an output destination of the feature amounts, on the basis of the environmental information. The imaging device according to the present technology further includes a state change information acquiring section that acquires state change information of an output destination of the feature amounts, and the control section can also determine the output destination according to the state change information. The imaging device according to the present technology further includes an emotion information acquiring section that acquires emotion information related to an emotion of the object, and the output unit can also output the feature amounts and the emotion information in association with each other. The imaging unit captures a plurality of images of a plurality of the objects, and the imaging device further includes a target selecting section that selects an object of interest from the plurality of the objects whose images have been captured by the imaging unit, and the feature amount extracting section can also extract a plurality of feature amounts of the object selected by the target selecting section.

Further, another imaging device according to the present technology includes an input unit that inputs a plurality of feature amounts of an object according to a priority level and an allowable amount of input, and a tracking section that tracks the object, on the basis of the feature amounts input by the input unit.

Further, a tracking system according to the present technology includes a plurality of imaging devices each having an imaging unit that captures an image of an object, a feature amount extracting section that extracts the plurality of feature amounts of the object whose image has been captured by the imaging unit, a priority determining section that determines priority of the plurality of feature amounts extracted by the feature amount extracting section, a transmitting section that transmits the feature amounts according to a level of the priority and an allowable amount of a transmission destination, a receiving section that receives the feature amounts according to the level of the priority and an allowable amount that is able to be received, and a tracking section that tracks the object, on the basis of the feature amounts received by the receiving section, in which the plurality of the imaging devices cooperates with each other to transmit and receive the feature amounts.

Further, an imaging method according to the present technology includes a step of capturing an image of an object, a step of extracting a plurality of feature amounts of the object whose image has been captured, a step of determining priority of the plurality of feature amounts that have been extracted, a step of determining the feature amounts according to a level of the priority and an allowable amount of an output destination, and a step of outputting the determined feature amounts. Further, another imaging method according to the present technology includes a step of inputting a plurality of feature amounts of an object according to a priority level and an allowable amount of input, and a step of tracking the object, on the basis of the input feature amounts.

Advantageous Effect of Invention

According to the present technology, an imaging device capable of increasing object detection accuracy while reducing the data bandwidth can be provided. In addition, the above effects are not necessarily limited, and together with the above effects or instead of the above effects, any of the effects illustrated in the present specification or other effects that can be obtained from the present specification may be exhibited.

BRIEF DESCRIPTION OF DRAWINGS

FIG. 3 is a flowchart illustrating an operation example of the imaging device according to the first embodiment of the present technology.

FIGS. 4A, 4B, and 4C depict images for explaining a tracking method by a tracking system according to the first embodiment of the present technology.

FIGS. 5A, 5B, 5C, and 5D depict conceptual diagrams illustrating list management by the tracking system according to the first embodiment of the present technology.

FIG. 6 is a sequence diagram illustrating an example of list distribution by the tracking system according to the first embodiment of the present technology.

FIG. 7 is a conceptual diagram for explaining a tracking method by the tracking system according to the first embodiment of the present technology.

FIG. 10 is a flowchart illustrating an example of the tracking method by the tracking system according to the second embodiment of the present technology.

FIGS. 11A, 11B, 11C, and 11D depict conceptual diagrams illustrating list management by a tracking system according to a third embodiment of the present technology.

FIG. 12 is a sequence diagram illustrating an example of a tracking method by the tracking system according to the third embodiment of the present technology.

FIG. 13 is a conceptual diagram for explaining a tracking method by a tracking system according to a fourth embodiment of the present technology.

DESCRIPTION OF EMBODIMENTS

Preferred embodiments for carrying out the present technology will be described below with reference to the drawings. The embodiments described below illustrate examples of typical embodiments of the present technology, and any embodiment can be combined with another. Moreover, the scope of the present technology is not interpreted narrowly by these. The description will be given in the following order.

1. First embodiment
(1) Configuration example of tracking system 10
(2) Configuration example of camera 12
(3) Operation example of camera 12
(4) Tracking method by tracking system 10
2. Second Embodiment
3. Third Embodiment
4. Fourth Embodiment

1. First Embodiment

(1) Configuration Example of Tracking System 10

Figure 1:
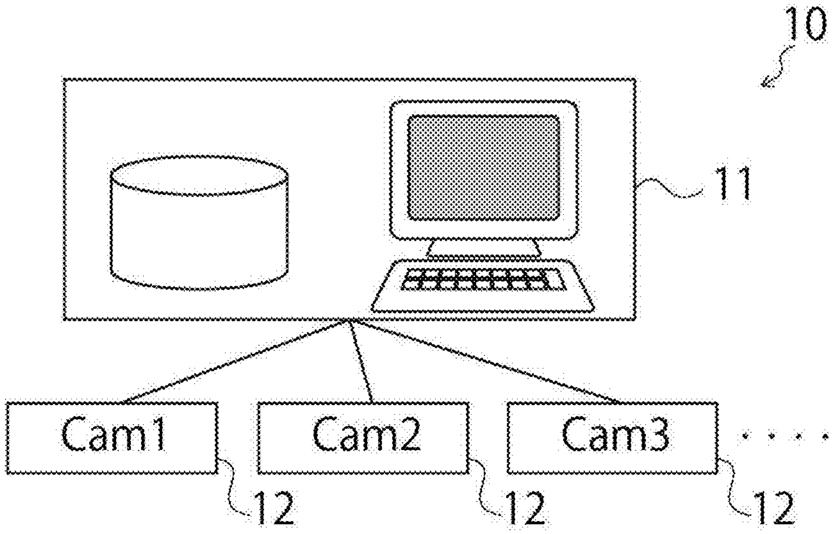
FIG. 1 is a schematic diagram illustrating a configuration example of a tracking system according to a first embodiment of the present technology.

First, a configuration example of a tracking system 10 according to the first embodiment of the present technology will be described with reference to FIG. 1. FIG. 1 is a schematic diagram illustrating a configuration example of the tracking system 10. The tracking system 10 can be applied to applications for tracking suspicious persons, traffic volume surveys, demo detection, and the like.

As illustrated in FIG. 1, the tracking system 10 includes, as an example, a server 11 and cameras 12 which are a plurality of imaging devices that is communicatively connected to the server 11. A cloud server can be used as the server 11.

Each camera 12 includes an RGB camera and a Depth camera, for example, and can capture images of one or more objects. Further, in the present embodiment, an example of using three cameras 12 (Cam 1, Cam 2, and Cam 3) is illustrated, but the number of cameras 12 is not limited to this, and may be two, four, or more.

The tracking system 10 captures the image of an object to be tracked by each of a plurality of cameras 12 (Cam 1, Cam 2, and Cam 3), and calculates feature amounts and three-dimensional moving direction vector of each object, thereby transmitting the calculation result information from the cameras 12 having captured the images to the server 11. Calculation of the feature amounts and the moving direction vector can be performed by use of artificial intelligence (AI), for example.

The server 11 that has received the calculation result information identifies the tracking target by comparing the feature amounts attributable to the calculation result information with the registered feature amounts, and sends information regarding the tracking target to each camera 12 according to the moving direction of the tracking target. Each camera 12 cooperates with each other to transmit and receive the feature amounts to track (perform tracking) the tracking target. The details of this tracking method will be described later.

(2) Configuration Example of Camera 12

Figure 2:
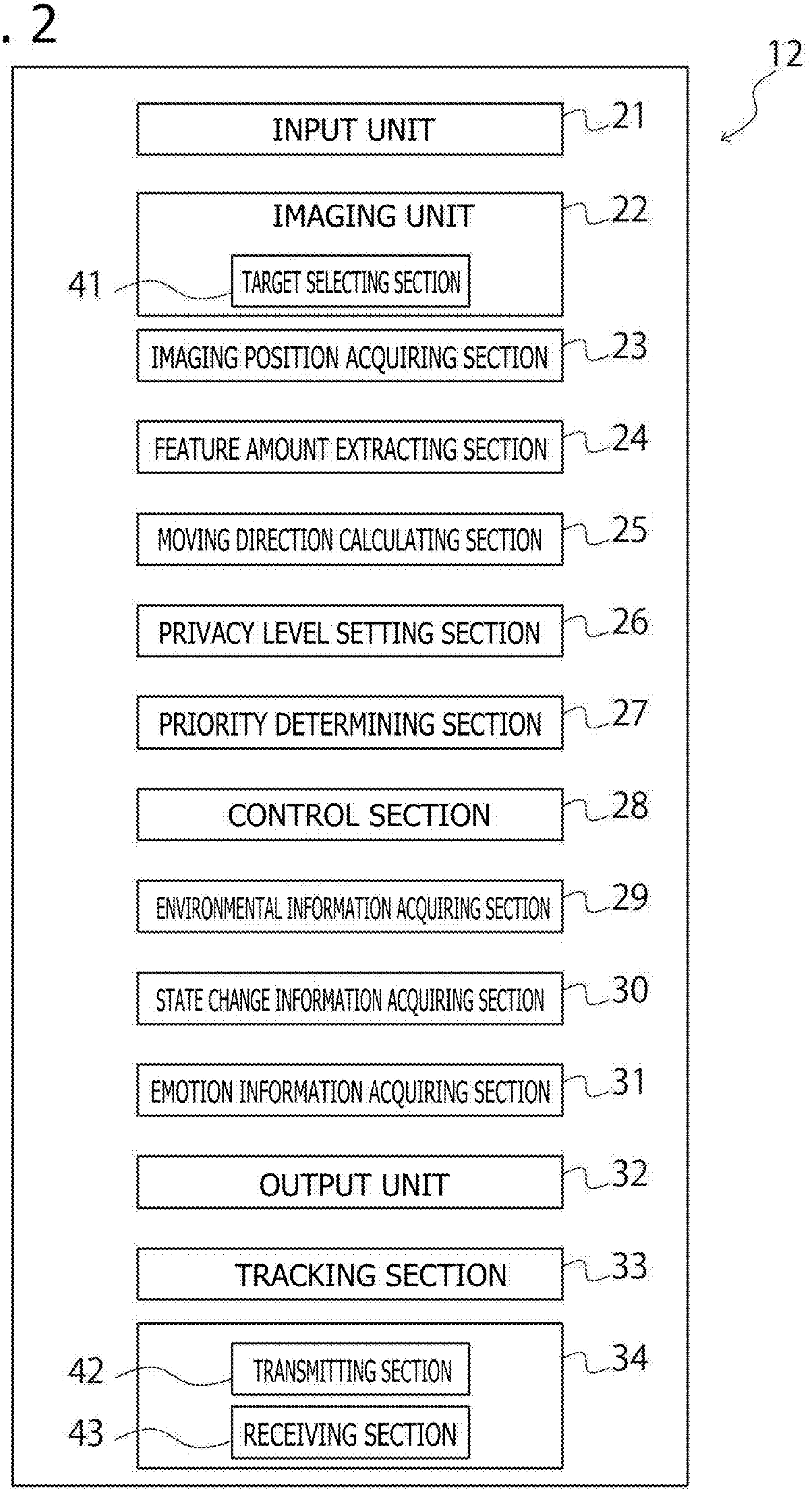
FIG. 2 is a block diagram illustrating a configuration example of an imaging device according to the first embodiment of the present technology.

Next, a configuration example of the camera 12 will be described with reference to FIG. 2. FIG. 2 is a block diagram illustrating a configuration example of the camera 12.

Examples of the cameras 12 to be used include RGB cameras, Depth cameras (iTOF/dToF/Structured Light/Stereo/Active Stereo), polarization cameras, DVS cameras, multispectral/IR cameras, high-speed vision cameras, infrared cameras, and the like.

As illustrated in FIG. 2, the camera 12 includes, for example, an input unit 21 inputting information received from the outside into a configuration that needs it, an imaging unit 22 capturing an image of an object, an imaging position acquiring section 23 acquiring an imaging position and an imaging direction of the imaging unit 22, a feature amount extracting section 24 extracting a plurality of feature amounts of the object whose image is captured by the imaging unit 22, and a moving direction calculating section 25 calculating the moving direction of the object.

Further, the camera 12 also has a priority determining section 27 determining the priority of the plurality of feature amounts extracted by the feature amount extracting section 24, and a control section 28 determining feature amounts according to a priority level and an allowable amount of the output destination, an environmental information acquiring section 29 acquiring environmental information around a location of the camera 12, a state change information acquiring section 30 acquiring state change information of the camera 12 to which the feature amounts is to be output, and an output unit 32 outputting the feature amounts determined in the control section 28.

Further, the camera 12 also includes a tracking section 33 that tracks the object on the basis of the feature amounts input by the input unit 21, and a communication unit 34 that transmits and receives information to and from the outside. Furthermore, the camera 12 can include an emotion information acquiring section 31 that acquires emotion information regarding the emotion of the object.

The input unit 21 can input the plurality of feature amounts of the object according to the priority level and the allowable input amount.

The imaging unit 22 can include a target selecting section 41 that selects an object of interest from a plurality of objects whose images are captured by the imaging unit 22. In addition, the imaging unit 22 can simultaneously capture the images of the objects in the same area. At this time, the feature amount extracting section 24 can extract the plurality of feature amounts of the object selected by the target selecting section 41. Note that the target selecting section 41 can also be provided as a component other than the imaging unit 22 in the camera 12.

The priority determining section 27 has a privacy level setting section 26 that sets the level of privacy protection for each feature amount. The priority determining section 27 can determine priority according to the privacy level set by the privacy level setting section 26.

The privacy level setting section 26 has a function of switching between "can handle" and "cannot handle" information having privacy concerns. Incidentally, information indicating the privacy level is added to the feature amounts. The privacy level setting section 26 also has a function of determining whether or not to output the feature amounts and controlling the order of output according to the privacy level when outputting the feature amounts.

The control section 28 can determine the output destination of the feature amounts on the basis of the environmental information acquired by the environmental information acquiring section 29, and can determine the output destination according to the state change information acquired by the state change information acquiring section 30.

The environmental information acquired by the environmental information acquiring section 29 includes latitude, longitude, time, direction, weather, temperature, humidity, airflow, $SO_2$, CO, NOx, SPM, $CO_2$, noise, and the like.

The state change information acquired by the state change information acquiring section 30 includes information in the case where the feature amounts that can be acquired by the target camera 12 have changed due to the feature-amount-detection algorithm replacement function, information in the case where the feature amounts cannot be acquired due to changes in the environment of the camera 12 (failure, brightness, bad weather, reduced battery capacity, etc.), and the like.

The output unit 32 can output the imaging position and imaging direction acquired by the imaging position acquiring section 23. In addition, the output unit 32 can output the feature amounts and the moving direction calculated by the moving direction calculating section 25 in association with each other and output the feature amounts and emotion information acquired by the emotion information acquiring section 31 in association with each other.

The communication unit 34 has a transmitting section 42 that transmits the feature amounts according to the priority level and the allowable amount of the transmission destination, and a receiving section 43 that receives the feature amounts according to the priority level and the allowable amount of reception.

A specific example of the feature amounts of the object will now be described. As the feature amounts extracted by the RGB camera, the key parts positions that are person's static features such as a person's face, hands, feet, fingerprints, physique, hair color, and eye color, movement amounts thereof, and the like can be cited. In addition, person's dynamic features such as gait, voice, gesture, and blink, moving direction vector, and the like can be cited. Further, the additional information includes the shape, color, pattern, movement amount of clothes or objects, belongings, accessories, shopping baskets, carriages, and the like.

In addition, the amount of movement, shape, reflectance (active method), and the like of a person or an object can be cited as feature amounts extracted by a Depth camera. Note that, although even an RGB camera can acquire a two-dimensional movement amount, a Depth camera capable of acquiring depth information can acquire a three-dimensional movement amount.

In addition to the above, the polarizing camera can extract similar feature amounts to those of the RGB camera, and can be used particularly for objects seen through glass or located underwater or the like. A DVS camera can extract feature amounts of the outline of a moving object of an object, the position change of a high-brightness or low-brightness object, and the like. A multispectral/IR camera can extract features amount such as the vegetation index (NDVI) of plants. A high-speed vision camera can extract feature amounts of the movement amount and vector of an object, patterns and characters on a high-speed moving object, and the like. In addition, an infrared camera can extract feature amounts of the temperature of a person or an object, and the like.

(3) Operation Example of Camera 12

Next, an operation example of the camera 12 will be described with reference to FIG. 3. FIG. 3 is a flowchart illustrating an operation example of the camera 12. When the imaging unit 22 of the camera 12 captures an image including an object, the following operations are started.

As illustrated in FIG. 3, in step S1, the feature amount extracting section 24 extracts an object from the RGB image captured by the imaging unit 22.

In step S2, the feature amount extracting section 24 extracts a plurality of feature amounts of the object from each extracted object.

In step S3, the moving direction calculating section 25 calculates the moving direction vector of each corresponding object from the Depth information.

In step S4, the control section 28 determines feature amounts from the extracted feature amounts according to the priority level and the allowable amount of the output destination, and packs the determined feature amounts and the information of the calculated moving direction vector for each object.

In step S5, the output unit 32 outputs the same number of pieces of packed data as the number of objects to the outside. That is, the output unit 32 can output the feature amounts determined by the control section 28 to the outside.

(4) Tracking Method by Tracking System 10

Next, a tracking method by the tracking system 10 according to the present embodiment will be described with reference to FIGS. 4A, 4B, 4C, 5A, 5B, 5C, 5D, 6, and 7. FIGS. 4A, 4B, and 4C depict images for explaining the tracking method by the tracking system 10. FIG. 4A illustrates an image captured by Cam 1 of the camera 12, FIG. 4B illustrates an image captured by Cam 2 of the camera 12, and FIG. 4C illustrates an image captured by Cam 3 of the camera 12.

In the present embodiment, as illustrated in FIG. 4B, a case is described where images in which Person 1 and Person 2 moves in a direction of Cam 1 (left direction in the figure) and Person 3 moves in a direction of Cam 3 (right direction in the figure) are captured by Cam 2, and Cam 1 tracks Persons 1 and 2, and Cam 3 tracks Person 3 on the basis of the captured images.

List management by the tracking system 10 will be described with reference to FIGS. 5A, 5B, 5C, 5D, and 6. FIGS. 5A, 5B, 5C, and 5D depict conceptual diagrams illustrating list management by the tracking system 10. FIG. 5A illustrates a list of feature amounts managed by the server 11 which is a host server, FIG. 5B illustrates a list of feature amounts managed by Cam 1, FIG. 5C illustrates a list of feature amounts managed by Cam 2, and FIG. 5D illustrates a list of feature amounts managed by Cam 3.

As illustrated in FIG. 5A, the server 11 manages a list of feature amounts 1 to 8, which are all feature amounts of the object to be tracked, for example. As illustrated in FIG. 5B, Cam 1 manages a list of feature amounts of the object to be tracked in the order of feature amounts 1, 3, 6, 2, 4, and 5 in descending order of priority, for example. As illustrated in FIG. 5C, Cam 2 manages a list of feature amounts of the object to be tracked in the order of feature amounts 2, 1, 4, 5, 3, and 6 in descending order of priority, for example. As illustrated in FIG. 5D, Cam 3 manages a list of feature amounts of the object to be tracked in the order of feature amounts 5, 2, 1, 3, 4, and 6 in descending order of priority, for example.

FIG. 6 is a sequence diagram illustrating an example of list distribution by the tracking system 10. As illustrated in FIG. 6, in a case where the server 11 that is a host server manages the feature amounts, the server 11 distributes lists of Cam 1 and Cam 3 to Cam 2, and distributes lists of Cam 2 to Cam 1 and Cam 3, respectively, for example.

Here, one camera 12 can handle a plurality of feature amounts extracted by the feature amount extracting section 24. The plurality of feature amounts is managed in a list (prioritized feature amount table) for each camera 12 as described above. Each camera 12 can independently determine the priority of the plurality of feature amounts in the list by the priority determining section 27.

When outputting the feature amounts, the transmitting side (sending source) camera 12 compares the lists of the transmitting side and the receiving side (transmission destination), and can rearrange and output the transmission data according to the priority of the receiving side camera 12.

In the case where the transmission/reception capacity is restricted due to restrictions of the communication band etc. or other system requirements, each camera 12 discards feature amounts in ascending order of priority, and can adjust a total capacity of the feature amounts to be output for each object such that the capacity falls within the restriction.

In addition, the list managed by each camera 12 is exchanged between the server 11 and the camera 12 or between the cameras 12 (by P2P) through communication at regular intervals or event communication that occurs when some kind of change occurs, so that a mechanism that can dynamically follow the state change of the camera 12 is established.

Next, a tracking method by the tracking system 10 via the server 11 will be described with reference to FIGS. 4A, 4B, 4C, and 7. FIG. 7 is a conceptual diagram for explaining the tracking method by the tracking system 10 via the server 11.

As illustrated in FIGS. 4A, 4B, 4C, and 7, the tracking system 10 captures images including Person 1, Person 2, and Person 3 which are the objects of tracking targets by means of Cam 2 of the camera 12, for example. Next, Cam 2 extracts the feature amounts of each Person 1, Person 2, and Person 3 from the captured images, and calculates the three-dimensional moving direction vector to pack the feature amounts and moving direction vector information for each person. Then, Cam 2 transmits packing information for each person to the server 11. The server 11 that has received the packing information collates the feature amounts in the packing information for each person with the feature amounts registered in the server 11 to identify the tracking target.

As illustrated in FIG. 7, in the case where the feature amounts of Person 1 are new feature amounts that have not been registered in the server 11 as a result of the collation, the server 11 registers the new feature amounts in the server 11 and determines that the movement destination of Person 1 is in the direction of Cam 1 on the basis of the moving direction vector information in the packing information. In the case where the feature amounts of Person 2 and Person 3 are already registered in the server 11, the server 11 determines that the feature amounts have already been registered in the server 11, and determines that the destination of Person 2 is in the direction of Cam 1 and the destination of Person 3 is in the direction of Cam 3 on the basis of the moving direction vector information in the packing information.

Then, the server 11 transmits information regarding Person 1 and Person 2 to Cam 1 and information regarding Person 3 to Cam 3 according to the moving directions of the tracking targets, and Cam 1 tracks (perform tracking) Person 1 and Person 2, and Cam 3 tracks Person 3.

Similarly to the operation of Cam 2, Cam 1 captures images including Person 1 and Person 2, and Cam 3 captures images including Person 3. Next, Cam 1 extracts the respective feature amounts of Person 1 and Person 2 from the captured images, and calculates a three-dimensional moving direction vector to pack the feature amounts and moving direction vector information for each person. The Cam 3 extracts the feature amounts of the Person 3 from the captured images, and calculates a three-dimensional moving direction vector to pack the feature amounts and moving direction vector information.

Then, Cam 1 transmits packing information for each person to the server 11, and Cam 3 transmits packing information regarding Person 3 to the server 11. The server 11 that has received the packing information collates the feature amounts in the packing information for each person with the feature amounts registered in the server 11 to identify the tracking target.

As illustrated in FIG. 7, as a result of collation, since the feature amounts of Person 1 and Person 2 have already been registered in the server 11, the server 11 determines that the destination of Person 1 is in the direction of Cam X and the destination of Person 2 is in the direction of Cam Y on the basis of the moving direction vector information in the packing information.

Similarly, as a result of collation, since the feature amounts of Person 3 have been registered in the server 11, the server 11 determines that the feature amounts of Person 3 have been registered in the server 11, and determines that the destination of the Person 3 is the direction of Cam Z on the basis of the direction vector information in the packing information.

Then, the server 11 transmits the information regarding Person 1, Person 2, and Person 3 to Cam X, Cam Y, and Cam Z, respectively, according to the moving direction of the tracking target, and Cam X tracks the Person 1, Cam Y tracks the Person 2, and Cam Z tracks Person 3. The tracking system 10 can repeat these operations and track the tracking targets with a plurality of cameras 12 in cooperation with each other.

As described above, the tracking system 10 having the plurality of cameras 12 according to the present embodiment can reduce the amount of data to be transmitted and received and reduce the load by using the feature amounts. In addition, the tracking system 10 can acquire data by carrying out switching to the camera 12 capable of recognizing persons and objects and acquiring a plurality of appropriate feature amounts. Also, the tracking system 10 can dynamically change the amount of communication between the cameras 12 according to the priority list. Therefore, according to the tracking system 10, it is possible to increase the object detection accuracy while reducing the data bandwidth.

Further, since only feature amounts are output and the tracking system 10 does not directly output information regarding individual face and body, individual privacy can be protected. In addition, since the tracking system 10 has moving direction vector information for each object (person), when tracking the plurality of persons whose images are captured by the plurality of cameras 12, the load of the processing for determining which camera 12 should be the switching destination for each object can be reduced. This also enables the tracking system 10 to increase the number of people that can be tracked. Incidentally, since the plurality of cameras 12 is used to check a person on the basis of the feature amounts, there is no need to overlap the imaging areas of the cameras 12.

2. Second Embodiment

Figure 8:
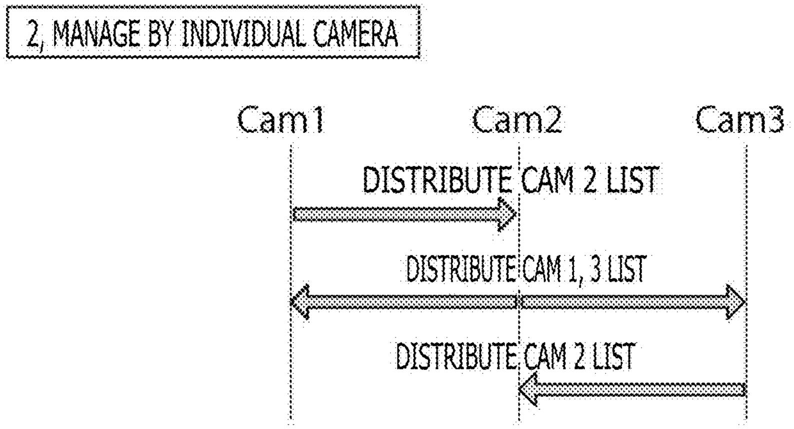
FIG. 8 is a sequence diagram illustrating an example of list distribution by a tracking system according to a second embodiment of the present technology.

Next, a tracking method by the tracking system according to the second embodiment of the present technology will be described with reference to FIGS. 8 to 10. FIG. 8 is a sequence diagram illustrating an example of list distribution by the tracking system according to the present embodiment. The tracking method according to the present embodiment differs from the tracking method according to the first embodiment in that information such as feature amounts is exchanged between the cameras 12. Other points of the present embodiment are similar to those of the first embodiment.

As illustrated in FIG. 8, in the case where individual cameras 12 manage the feature amounts, Cam 2 distributes lists of Cam 1 and Cam 3 to Cam 1 and Cam 3, respectively, and Cam 1 and Cam 3 distribute lists of Cam 2 to Cam 2, respectively, for example.

Next, with reference to FIGS. 9 and 10, a description will be given of a tracking method for automatic tracking in which only the plurality of cameras 12 is cooperated with each other by the tracking system 10. FIG. 9 is a conceptual diagram for explaining the tracking method by the tracking system according to the present embodiment. FIG. 10 is a flow chart illustrating an example of a tracking method by the tracking system according to the present embodiment.

Figure 9:
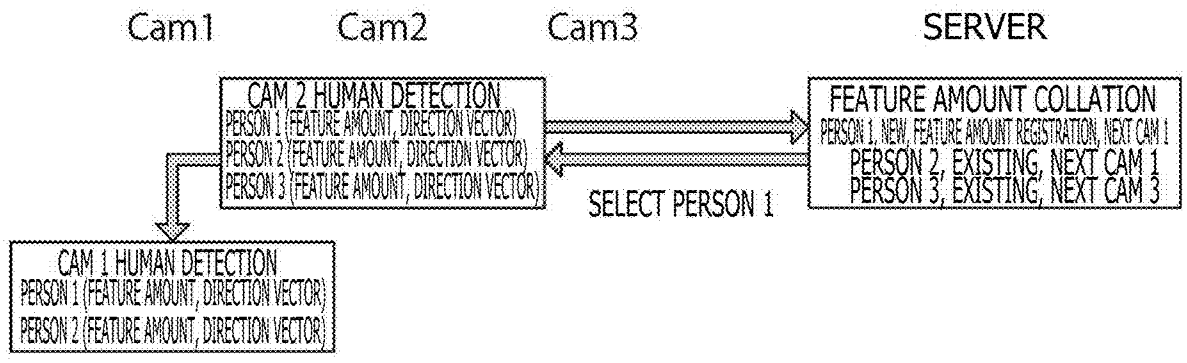
FIG. 9 is a conceptual diagram for explaining a tracking method by the tracking system according to the second embodiment of the present technology.

As illustrated in FIGS. 9 and 10, in step S11, the Cam 2 of the camera 12 captures images including the tracking targets Person 1, Person 2, and Person 3, and detects Person 1, Person 2, and Person 3. At this time, Cam 2 extracts the feature amounts of each of Person 1, Person 2, and Person 3 from the captured images, and calculates the three-dimensional moving direction vector, thereby packing the feature amounts and moving direction vector information for each person. Then, Cam 2 then transmits packing information for each person to the server 11.

In step S12, the server 11 or Cam 2 selects Person 1 who is a person of interest as a tracking target. At this time, the server 11 that has received the packing information collates the feature amounts in the packing information for each person with the feature amounts registered in the server 11 to identify the tracking target.

As illustrated in FIG. 9, in the case where the feature amounts of Person 1 are new feature amounts that have not been registered in the server 11 as a result of collation, the server 11 registers the new feature amounts in the server 11 and determines that the movement destination of Person 1 is in the direction of Cam 1 on the basis of the moving direction vector information in the packing information. In the case where the feature amounts of Person 2 and Person 3 are feature amounts already registered in the server 11, the server 11 determines that the feature amounts have already been registered in the server 11, and determines that the destination of Person 2 is in the direction of Cam 1 and the destination of Person 3 is in the direction of Cam 3 on the basis of the moving direction vector information in the packing information. Then, the server 11 transmits the information of the selected Person 1 to Cam 2.

In step S13, Cam 2 keeps an eye on and tracks Person 1 on the basis of the information regarding Person 1 received from the server 11.

In step S14, Cam 2 determines that the destination of Person 1 is the direction of Cam 1 on the basis of the moving direction vector information in the packing information. Then, Cam 2 transmits an instruction to switch the imaging camera to Cam 1 and the information of Person 1 to Cam 1.

In step S15, Cam 1 continues tracking Person 1 in a similar manner to that of Cam 2. At this time, Cam 1 captures images including Person 1. Next, Cam 1 extracts the feature amounts of Person 1 from the captured images and calculates a three-dimensional moving direction vector. Cam 1 determines a plurality of feature amounts from among the extracted feature amounts according to the priority level and the allowable amount of the output destination, and packs the determined feature amounts and the calculated moving direction vector information of Person 1. Cam 1 determines the camera 12 of the destination of Person 1 on the basis of the moving direction vector information in the packing information. Then, the Person 1, which is an object, is tracked based on the feature amounts in the packing information. After that, Cam 1 transmits an instruction to switch the imaging camera and the information of the Person 1 to the determined camera 12.

As described above, according to the tracking method according to the present embodiment, the object detection accuracy can be increased while the data bandwidth is reduced, similarly to the tracking method according to the first embodiment. Further, according to the tracking method related to the present embodiment, since the plurality of cameras 12 can cooperate with each other without involving the server 11 to transmit and receive feature amounts, the tracking target can be automatically tracked at a higher speed.

3. Third Embodiment

Next, a tracking method by the tracking system 10 according to the third embodiment of the present technology will be described with reference to FIGS. 11A, 11B, 11C, 11D, and 12. FIGS. 11A, 11B, 11C, and 11D depict conceptual diagrams illustrating list management by the tracking system 10 according to the present embodiment. FIG. 11A illustrates a list of feature amounts managed by the server 11 that is a host server, FIG. 11B illustrates a list of feature amounts managed by Cam 1, FIG. 11C illustrates a list of feature amounts managed by Cam 2, and FIG. 11D illustrates a list of feature amounts managed by Cam 3. The tracking method according to the present embodiment differs from the tracking method according to the first embodiment in that the priority of feature amounts is determined according to the privacy level. Other points of the present embodiment are similar to those of the first embodiment.

As illustrated in FIG. 11A, the server 11 manages a list in which feature amounts 1 to 8, which are all feature amounts of the object to be tracked are associated with privacy levels, for example. In the present embodiment, feature amounts 1 to 3 and 6 to 8 are at privacy level 0, feature amount 4 is at privacy level 1, and feature amount 5 is at privacy level 2.

As illustrated in FIG. 11B, Cam 1 manages a list of feature amounts of the object to be tracked in the order of feature amounts 1, 3, 6, 2, 4, and 5 in descending order of priority, for example. As illustrated in FIG. 11C, Cam 2 manages a list of feature amounts of the object to be tracked in the order of feature amounts 2, 1, 4, 5, 3, and 6 in descending order of priority, for example. As illustrated in FIG. 11D, the Cam 3 manages a list of feature amounts of the object to be tracked in the order of feature amounts 5, 2, 1, 3, 4, and 6 in descending order of priority, for example. Then, the feature amount 4 of each of Cam 1, Cam 2, and Cam 3 is at privacy level 1, and the feature amount 5 is at privacy level 2. Feature amounts other than feature amounts 4 and 5 of Cam 1, Cam 2, and Cam 3 have a privacy level of zero.

FIG. 12 is a sequence diagram illustrating an example of a tracking method by the tracking system according to the present embodiment.

As illustrated in FIG. 12, for example, in the case of transmitting the information regarding Person 1 from Cam 1 to Cam 2 of the camera 12, the information regarding Person 1 acquired by Cam 1 is not transmitted in the priority order of the list of Cam 1 as it is, but transmitted after the list is rearranged according to the priority and privacy level of the list of Cam 2 on the receiving side. If there is a limit to the data transmission/reception capacity, the data to be output is deleted in ascending order of priority or in descending order of privacy level, and then transmitted.

Cam 2 collates the received information regarding Person 1 from Cam 1 with the information regarding Person 1 acquired by Cam 2, and determines whether or not they agree with each other. In the case where they agree, the person is assumed to be Person 1, and Cam 2 tracks Person 1. In the case where they do not match, the person is regarded as a different person from Person 1 and is compared with another possible person acquired by Cam 2.

After that, in the case where Person 1 moves from the imaging range of Cam 2 toward Cam 3, Cam 2 sends the information of Person 1 after rearranging the list according to the priority and privacy level of the list of Cam 3 on the receiving side.

Similarly to Cam 2, Cam 3 collates the received information of Person 1 from Cam 2 with the information of Person 1 acquired by Cam 3, and determines whether or not they match. In the case where they match, the person is assumed to be Person 1, and Cam 3 continues tracking Person 1. In the case where they do not match, the person is determined to be a different person from Person 1 and is compared with another possible person acquired by Cam 3.

As described above, according to the tracking method related to the present embodiment, similarly to the tracking method according to the first embodiment, it is possible to increase the object detection accuracy while reducing the data bandwidth, and to make the load of determination processing lighter. Further, according to the tracking method related to the present embodiment, since the feature amount to be transmitted is determined according to the privacy level, privacy can further be protected.

4. Fourth Embodiment

Next, a tracking method by the tracking system 10 according to the fourth embodiment of the present technology will be described with reference to FIG. 13. FIG. 13 is a conceptual diagram for explaining the tracking method by the tracking system 10 according to the present embodiment. The tracking method according to this embodiment differs from the tracking method according to the first embodiment in that objects such as persons are tracked in consideration of the emotion information of a plurality of persons. Other points of this embodiment are similar to those of the first embodiment.

As illustrated in FIG. 13, the tracking system 10 according to the present embodiment captures images including Person 1, Person 2, and Person 3 with Cam 1 of the camera 12, and extracts respective feature amounts of Person 1, Person 2, and Person 3, from the captured images, thereby calculating a three-dimensional moving direction vector and obtaining emotion information. Also, images including Person 4, Person 5, and Person 6 are captured by Cam 2, and the feature amounts of each of Person 4, Person 5, and Person 6 are extracted from the captured images, so that the three-dimensional moving direction vector is calculated and emotional information is acquired. In addition, images containing Person 7, Person 8, and Person 9 are captured by Cam 3, and the feature amounts of each of Person 7, Person 8, and Person 9 are extracted from the captured images, so that the three-dimensional moving direction vector is calculated, and emotional information is acquired.

As described above, according to the tracking method related to the present embodiment, similarly to the tracking method according to the first embodiment, the object detection accuracy can be increased while the data bandwidth is reduced. Further, according to the tracking method related to the present embodiment, the objects to be tracked can be tracked according to the emotional flow in the whole place because the flow of emotions in the whole place can be grasped from the emotion information of a plurality of Persons 1 to 9 acquired by Cam 1, Cam 2, and Cam 3.

Note that the present technology can take the following configurations.

(1)

An imaging device including:

an imaging unit that captures an image of an object;

a feature amount extracting section that extracts a plurality of feature amounts of the object whose image has been captured by the imaging unit;

a priority determining section that determines priority of the plurality of feature amounts extracted by the feature amount extracting section;

a control section that determines the feature amounts according to a level of the priority and an allowable amount of an output destination; and an output unit that outputs the feature amounts determined by the control section.

(2)

The imaging device according to (1), in which the imaging unit simultaneously captures the image of the object in a same area.

(3)

The imaging device according to (1) or (2), further including:

a moving direction calculating section that calculates a moving direction of the object, in which the output unit outputs the feature amounts and the moving direction in association with each other.

(4)

The imaging device according to any one of (1) to (3), in which the priority determining section has a privacy level setting section that sets a privacy level of each of the feature amounts, and determines the priority according to the privacy level.

(5)

The imaging device according to any one of (1) to (4), further including:

an imaging position acquiring section that acquires an imaging position and an imaging direction of the imaging unit, in which the output unit outputs the imaging position and the imaging direction.

(6)

The imaging device according to any one of (1) to (5), further including:

an environmental information acquiring section that acquires environmental information around the imaging device, in which the control section determines an output destination of the feature amounts, on the basis of the environmental information.

(7)

The imaging device according to any one of (1) to (6), further including:

a state change information acquiring section that acquires state change information of an output destination of the feature amounts, in which the control section determines the output destination according to the state change information.

(8)

The imaging device according to any one of (1) to (7), further including:

an emotion information acquiring section that acquires emotion information related to an emotion of the object, in which the output unit outputs the feature amounts and the emotion information in association with each other.

(9)

The imaging device according to any one of (1) to (8), in which the imaging unit captures a plurality of images of a plurality of the objects, and the imaging device further includes a target selecting section that selects an object of interest from the plurality of the objects whose images have been captured by the imaging unit, and the feature amount extracting section extracts a plurality of feature amounts of the object selected by the target selecting section.

(10)

An imaging device including:

an input unit that inputs a plurality of feature amounts of an object according to a priority level and an allowable amount of input; and a tracking section that tracks the object, on the basis of the feature amounts input by the input unit.

(11)

A tracking system in which a plurality of imaging devices cooperates with each other to transmit and receive a plurality of feature amounts, the imaging devices each including:

an imaging unit that captures an image of an object;

a feature amount extracting section that extracts the plurality of feature amounts of the object whose image has been captured by the imaging unit;

a priority determining section that determines priority of the plurality of feature amounts extracted by the feature amount extracting section;

a transmitting section that transmits the feature amounts according to a level of the priority and an allowable amount of a transmission destination;

a receiving section that receives the feature amounts according to the level of the priority and an allowable amount that is able to be received; and a tracking section that tracks the object, on the basis of the feature amounts received by the receiving section.

(12)

An imaging method including:

a step of capturing an image of an object;

a step of extracting a plurality of feature amounts of the object whose image has been captured;

a step of determining priority of the plurality of feature amounts that have been extracted;

a step of determining the feature amounts according to a level of the priority and an allowable amount of an output destination; and a step of outputting the determined feature amounts.

(13)

An imaging method including:

a step of inputting a plurality of feature amounts of an object according to a priority level and an allowable amount of input; and a step of tracking the object, on the basis of the input feature amounts.

REFERENCE SIGNS LIST

10: Tracking system
11: Server
12: Camera (imaging device)
21: Input unit
22: Imaging unit
23: Imaging position acquiring section
24: Feature amount extracting section
25: Moving direction calculating section
26: Privacy level setting section
27: Priority determining section
28: Control section
29: Environmental information acquiring section
30: State change information acquiring section
31: Emotion information acquiring section
32: Output unit
33: Tracking section
34: Communication unit
41: Target selecting section
42: Transmitting section
43: Receiving section

The invention claimed is:

1. An imaging device, comprising:

an imaging unit configured to capture an image of an object;

a feature amount extracting section configured to extract a plurality of feature amounts of the object from the captured image;

a priority determining section configured to determine a priority of each of the extracted plurality of feature amounts;

a control section configured to determine a set of feature amounts from the extracted plurality of feature amounts, based on a level of the priority of each of the extracted plurality of feature amounts and an allowable feature amount of a first output destination; and an output unit configured to output the determined set of feature amounts to the first output destination.

2. The imaging device according to claim 1, wherein the imaging unit is further configured to simultaneously capture a plurality of images of a plurality of objects in a same area, and the captured plurality of images includes the captured image.

3. The imaging device according to claim 1, further comprising:

a moving direction calculating section configured to calculate a moving direction of the object, wherein the output unit is further configured to output the determined set of feature amounts and the calculated moving direction, and the output of the determined set of feature amounts is in association with the calculated moving direction.

4. The imaging device according to claim 1, wherein the priority determining section includes a privacy level setting section, and the privacy level setting section is configured to:

set a privacy level of each of the extracted plurality of feature amounts; and determine the priority of each of the extracted plurality of feature amounts based on a respective privacy level of the set privacy level of each of the extracted plurality of feature amounts.

5. The imaging device according to claim 1, further comprising:

an imaging position acquiring section configured to acquire an imaging position of the imaging unit and an imaging direction of the imaging unit, wherein the output unit is further configured to output the acquired imaging position and the acquired imaging direction.

6. The imaging device according to claim 1, further comprising:

an environmental information acquiring section configured to acquire environmental information around the imaging device, wherein the control section is further configured to determine a second output destination based on the acquired environmental information.

7. The imaging device according to claim 1, further comprising:

a state change information acquiring section configured to acquire state change information of the first output destination, wherein the control section is further configured to determine a second output destination based on the acquired state change information.

8. The imaging device according to claim 1, further comprising:

an emotion information acquiring section configured to acquire emotion information related to an emotion of the object, wherein the output unit is further configured to output the determined set of feature amounts and the acquired emotion information, and the output of the determined set of feature amounts is in association with the acquired emotion information.

9. The imaging device according to claim 1, wherein the imaging unit is further configured to simultaneously capture a plurality of images of a plurality of objects, the plurality of objects is in an area associated with the imaging device,
the captured plurality of images includes the captured image,
the imaging device further includes a target selecting section, and
the target selection section is configured to select the object from the plurality of objects.

10. An imaging device, comprising:
an input unit configured to input a set of feature amounts of a plurality of feature amounts of an object, wherein
the input set of feature amounts of the plurality of feature amounts is associated with a priority level of each of the plurality of feature amounts and an allowable feature amount of the input unit; and
a tracking section configured to track the object based on the input set of feature amounts.

11. A tracking system, comprising:
a plurality of imaging devices, wherein
each of the plurality of imaging devices is configured to:
transmit a plurality of first feature amounts of an object; and
receive a plurality of second feature amounts of the object, and
each of the plurality of imaging devices comprises:
an imaging unit configured to capture an image of the object;
a feature amount extracting section configured to extract the plurality of first feature amounts of the object from the captured image;
a priority determining section configured to determine a first priority of each of the extracted plurality of first feature amounts;
a transmitting section configured to transmit a set of first feature amounts of the extracted plurality of first feature amounts to a transmission destination, wherein the set of first feature amounts of the extracted plurality of first feature amounts is transmitted based on a level of the first priority of each of the extracted plurality of first feature amounts and an allowable feature amount of the transmission destination;
a receiving section configured to receive a set of second feature amounts of the plurality of second feature amounts, wherein the received set of second feature amounts is associated with a second priority level of each of the plurality of second feature amounts and an allowable feature amount of the receiving section; and
a tracking section configured to track the object based on the received set of second feature amounts.

12. An imaging method, comprising:
capturing an image of an object;
extracting a plurality of feature amounts of the object from the captured image;
determining a priority of each of the extracted plurality of feature amounts;
determining a set of feature amounts from the extracted plurality of feature amounts, based on a level of the priority of each of the extracted plurality of feature amounts and an allowable feature amount of an output destination; and
outputting the determined set of feature amounts to the output destination.

13. An imaging method, comprising:
inputting, by an input unit of an image device, a set of feature amounts of a plurality of feature amounts of an object, wherein
the input set of feature amounts of the plurality of feature amounts is associated with a priority level of each of the plurality of feature amounts and an allowable feature amount of the input unit; and
tracking, by a tracking section of the image device, the object based on the input set of feature amounts.

* * * * *